June 3, 1969  J. W. LUCAS  3,447,860

LARGE APERTURE ACHROMAT OBJECTIVE

Filed July 3, 1967  Sheet 1 of 3

INVENTOR.
James W. Lucas

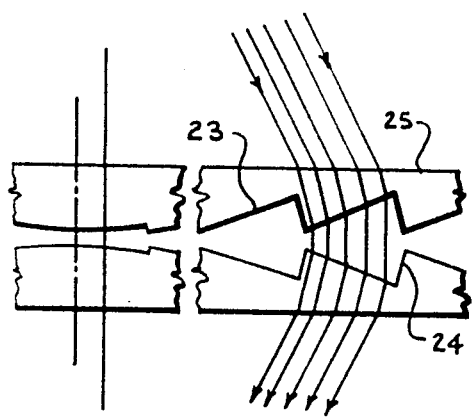
FIG. 5
PRIOR ART
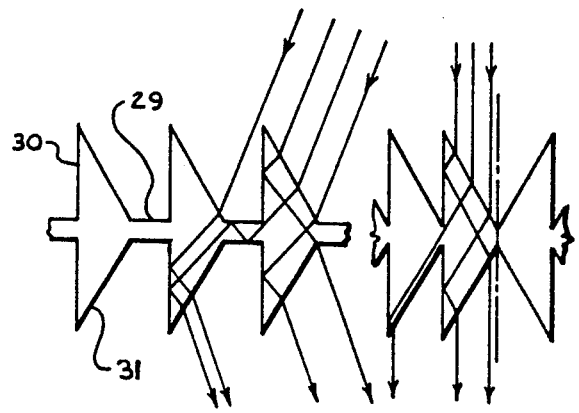
FIG. 7
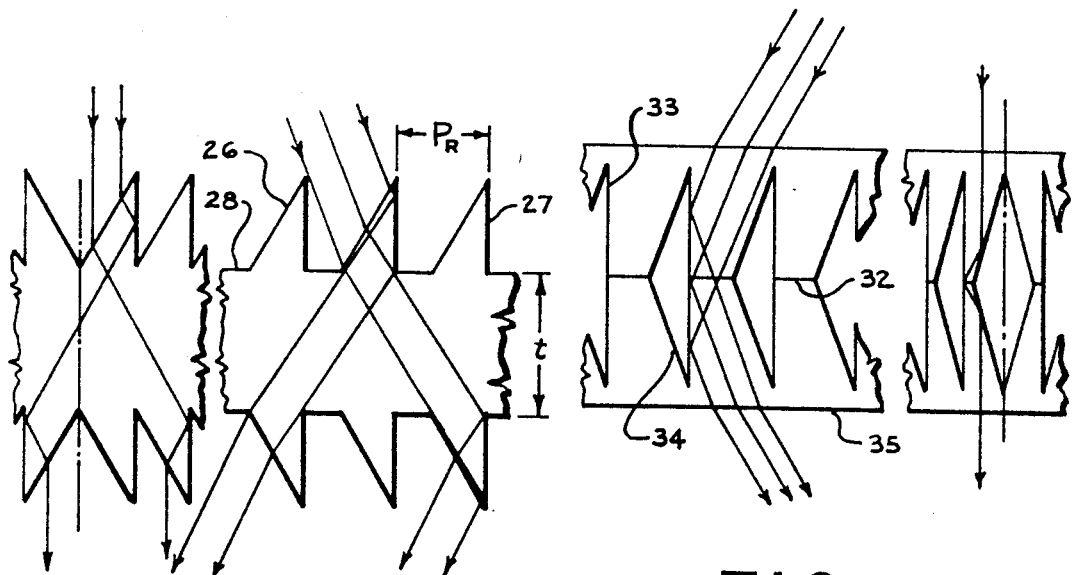
FIG. 6
FIG. 8

United States Patent Office 3,447,860
Patented June 3, 1969

---

3,447,860
LARGE APERTURE ACHROMAT OBJECTIVE
James W. Lucas, 1480 N. Doheny Drive,
Los Angeles, Calif. 90069
Continuation-in-part of application Ser. No. 270,493,
Mar. 29, 1963. This application July 3, 1967, Ser.
No. 655,989
Int. Cl. G02b 3/08
U.S. Cl. 350—211          4 Claims

ABSTRACT OF THE DISCLOSURE

A lens including at least one element containing a multiplicity of grooves or ridges wherein bending of light rays is accomplished by internal reflection rather than by refraction. A concentrically grooved element may be employed as a light gathering system. An image forming lens is disclosed having two elements, the first of which has concentric or spiralled grooves on both surfaces, and the other of which has radial grooves on both surfaces.

---

This application is a continuation-in-part of my copending application Ser. No. 270,493, filed Mar. 29, 1963, which was a continuation-in-part of my application Ser. No. 14,692, filed Mar. 14, 1960. Both of these applications are now abandoned.

This invention relates to image-forming optical systems, and more particularly, to achromatic systems of large relative aperture.

At present, large aperture image-forming systems are quite expensive, since lens corrections become much more difficult as the angle of refraction of peripheral rays increases. The use of aspheric lens surfaces would avoid the need for corrections due to spherical aberrations, but these surfaces are costly to produce by grinding. Molded plastic lenses could have aspheric surfaces without grinding, except for inaccuracies due to shrinkage when cooling after fabrication.

The only satisfactory, economical method of producing aspheric surfaces appears to be the pressing of transparent plastic into the form of Fresnel lenses. These are lenses in which a plano-convex element is reduced to a flat form by eliminating the variation in lens thickness, while preserving the surface contour in the form of concentric stepped rings. Thus, the surface angle at any radius can be completely independent of all other surface angles, and an aspheric surface can be produced as easily as a spherical one. However, since undercut steps would prevent removal of the lens from the die, contoured rings cannot be used on both surfaces of the lens without incurring substantial light losses due to the steps, primarily on the side toward the light source, and especially if this should also be on the shorter conjugate.

It can readily be seen that if Fresnel lenses are generally restricted to plano-convex forms in order to reduce light losses, these lenses will have acute chromatic aberrations, since most of the light refraction will occur at one surface.

The device of my invention might best be described as a simplified large aperture achromat objective. The bending of light rays is accomplished by internal reflection rather than by refraction, making this lens effective both as a wide-angle objective and as an objective of large relative aperture.

A principal object of my invention is to provide a large aperture achromatic lens which is inexpensive to produce.

A further object is the provision of a simple lens of variable focal length.

An additional object is to make possible a wide-angle objective with a minimum of "vignetting."

A still further object is to provide an efficient, single-element, light-gathering system.

Another object of my invention is the provision of a light-gathering system of constant intensity from corner to corner.

Yet another object is to provide an objective which forms an erect image.

An additional object is the provision of a projection lens without "Keystone" distortion.

A more complete description of a preferred embodiment of my novel lens follows: It is composed essentially of two flat transparent sheets, one containing similar concentric or spiralled grooves on both surfaces, and the other having radial grooves on both surfaces. One wall of each groove is substantially perpendicular to the plane of the sheet, and provides a surface for internal reflection of light rays as they pass through the lens. Equal refraction of the rays occurs at both external surfaces due to the slope on the opposite wall of each groove, but no chromatic aberration results, since the refraction at one surface is exactly equal and opposite to the refraction at the other surface. This principle, which is similar to that used in the isosceles single reflection prism, allows an efficient achromatic lens to be inexpensively produced.

The lens as herein described has no focal length of its own but, when used flat, will always form an image at a distance equal to the object distance. This feature makes the concentrically grooved component of my invention extremely efficient alone as a light-gathering system, when short conjugates can be used. The two components, when used as an image-forming system, can be made to focus without changing the location of the lens merely by crowning the concentrically grooved component. The amount of crowning given to the concentrically grooved component determines the focal length. Thus, the lens of my invention can also be used as a "zoom" lens, since the focal length can be varied by crowning the concentrically grooved component, while changing the distance from the lens to the focal plane.

In addition, my novel lens is usable as an improved telescope objective, since it eliminates the need for an erector by forming an upright image.

When my lens is used as a projection lens, the normal "keystone" distortion of the projected image does not occur. In conventional lenses, the lens is brought closer to the object plane in order to focus on a more distant image plane. Thus, the image size is increased at the top by the greater distance to the screen, as well as by the shorter distance to the object plane. In the lens of my invention, the disproportionate image increase is counteracted by the fact that the object plane is further from the lens, for focusing at a greater image distance.

When the concentrically grooved component of my novel lens is used separately as a light-gathering element, the less intense oblique rays enter the lens nearly normal to the sloped surface of each ridge. The paraxial rays, more intense since they are closer to the source of light, strike the sloped surfaces of the ridges at an angle further from the normal. Thus, an area of nearly constant light intensity is produced over the entire width of the lens.

Additional objects and distinguishing features of this invention will become apparent from the following detailed specification, and by reference to the accompanying drawings, of which:

FIGURE 5 is a radial sectional view showing the paths of light rays through a pair of conventional Fresnel lenses, in a light gathering system.

FIGURE 6 is a radial sectional view showing the paths of light rays through a preferred embodiment of my lens when used as a single-element light gathering system.

FIGURE 7 shows an alternate single-element light gathering system.

FIGURE 8 is a radial sectional view through a cemented two-piece light gathering system.

Figure 1:
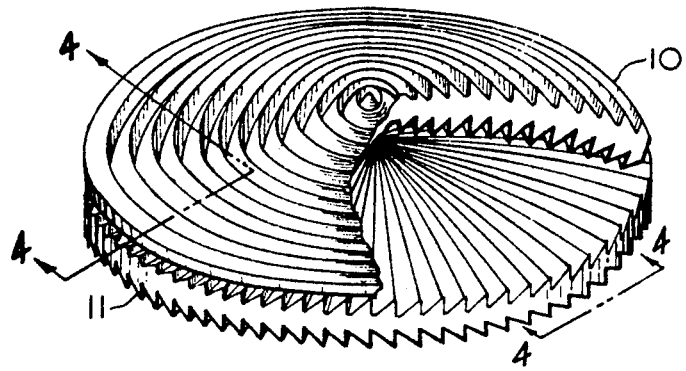
FIGURE 1 is a perspective cutaway view of the two-element image forming lens.

In FIGURE 1, the two-element, image forming version of my novel lens is shown to be comprised of a flexible, concentrically grooved element 10, and a radially grooved element 11, mounted with their peripheries together. Element 11 may also be flexible, but this condition is not required.

Figure 2:
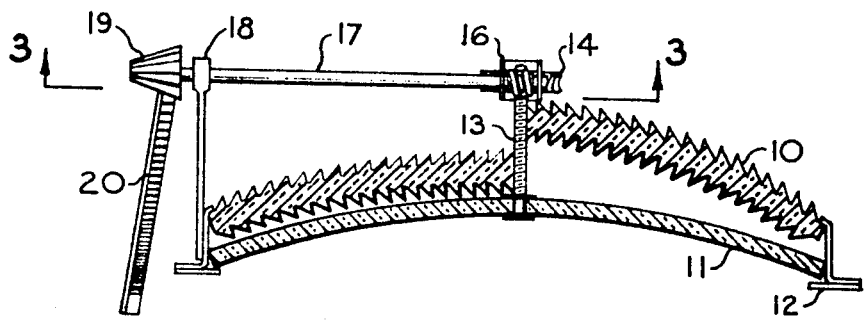
FIGURE 2 is a cross-sectional view of the lens in FIGURE 1, showing the left hand portion adjusted as a long-focus lens, and the right hand portion as a short-focus lens.

In FIGURE 2, element 10 is shown in two positions, crowned differently as a short focus or as a long focus lens. The thickness and material of element 10 are chosen so that crowning the lens by adjustment screw 13, while the edges are retained in mounting ring 12, will create the proper angular deflection to maintain a flat image at the focal plane. This angular deflection is quite critical, since an error of 1° will create an error of 2° in the emerging ray.

Figure 3:
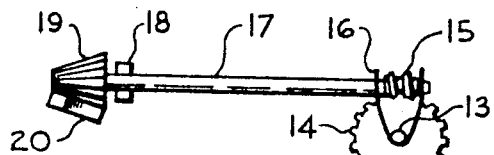
FIGURE 3 is a sectional view taken along line 3—3 in FIGURE 2.

If the "zoom" feature of this lens is to be used, adjustment screw 13 has worm gear 14 affixed on the end, and is held in contact with worm 15 by bracket 16, as shown in FIGURE 3. Shaft 17 has worm 15 on the inner end and bevel gear 19 on the outer end, and rotates in bearing 18 attached to lens mount 12. The angular placement of rack 20, fixed relative to the focal plane except for lengthwise adjustment to focus lens, causes an increased rate of crowning of element 10 as the focal length is decreased. Thus, my novel lens will remain focused for a fixed object distance while varying its focal length. The light may enter either side of the lens combination illustrated in FIGURE 1, i.e., may strike either element 10 or 11 first.

It should be noted that element 11 is important only for extra-axial, or oblique, rays. Consequently, element 10 can be used alone as a light-gathering lens, where all rays issue from the vicinity of the optical axis.

Figure 4:
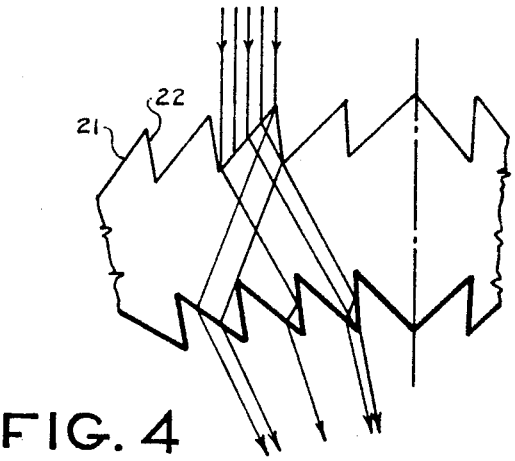
FIGURE 4 shows the paths of typical light rays through a section of the image forming lens in FIGURE 1. This section represents both a radial cut through the concentrically grooved element, and a cut along an arc through the radially grooved element.

As shown in FIGURE 4, elements 10 and 11 function with respect to those light rays which are not parallel to the sloped walls of the grooves therein. Thus, each of these elements complements the other by operating on light rays which are not affected by the other.

It will be seen from FIGURE 4 that as approaching light rays become more nearly parallel to sloping surfaces 21, a greater portion of the light is lost by impinging on vertical surfaces 22. Thus, the full effective aperture of the lens is only about half the diameter, and the image at any area of the focal plane is always formed primarily by the portion of the lens directly ahead of it. Wide angle effects are thus minimized, flatness of field is kept at an acceptable level, and vignetting is eliminated. The action of element 10 would be identical if the locations of surfaces 21 and 22 were interchanged relative to the optical centerline as shown in FIGURE 6, except that some vignetting would result and less of the light would be used.

Conventional Fresnel lenses are nearly always used in pairs, as shown in FIGURE 5, and are suitable only for light-gathering purposes. Refraction of the light rays occurs at both surfaces 23 and at both surfaces 25. As would be expected, the chromatic aberration of the emerging rays is substantial. The nearly vertical walls 24 serve no useful purpose, but are a result of the stepped nature of the lens.

One alternate configuration of my novel lens, as shown in FIGURE 6, is effective as a single light-gathering element. The surface losses of conventional Fresnel lenses have been cut in half, and the misalignment losses eliminated. Peripheral rays, instead of experiencing additional losses due to extreme angles of incidence as in Fresnel lenses, approach my lens more nearly normal to surfaces 26, so that losses are held to a minimum. Refraction at surfaces 26 directs the rays against surfaces 27 at an angle such that internal reflection occurs, and the rays are redirected toward opposite surfaces 26 in a convergent beam rather than the divergent beam in which they entered the lens. The refraction occurring at second surface 26 is equal, but opposite, to the original refraction, completely eliminating any chromatic aberration. Planer elements 28 serve no purpose other than maintaining the least-loss relationship between $P_R$, or pitch at radius R, and base thickness $t$. It will be noticed that the ray bundle entering one ring is split, and emerges from two alternate rings on the opposite side. The angle of surfaces 27 may be slightly off the vertical so as to form an obtuse angle with surface 28, allowing the split bundle to meet again at the optical axis. This angle is a function of the base thickness which determines the extent to which the ray bundle is split. Thus, this angle may be calculated by applying fundamental geometric principles. Surface 27 may be inclined on the exit or both sides of the lens as desired. This configuration is preferable when a base thickness greater than the pitch is required.

As shown in FIGURE 5, each bundle of light rays issuing from one surface 23 is directed through the opposite surface 23. There is no division of ray bundles while passing through the pair of conventional Fresnel lenses. In my novel lens as shown in FIGURE 6, each ray bundle is divided within the lens, and issues from at least two separate ridges on the opposite side. Thus the thickness $t$ can be as large as is required for structural reasons, while allowing shallow grooves to be used.

Another version of my single-element light gathering lens is shown in FIGURE 7. This configuration is preferable when a base thickness less than the pitch is required. Practically all the light rays follow a path similar to that described in the foregoing paragraph. However, those rays passing between planer elements 29 are internally reflected by these elements and directed toward vertical surfaces 30, where they are reflected out through surfaces 31 parallel to adjacent emerging rays.

The light gathering lens shown in FIGURE 8 is composed of two similar elements cemented together along their transparent surfaces 32. Surfaces 33 and 34 thus form annular airspaces which will serve to protect the surfaces from scratches and also exclude dust. External surfaces 35 are then flat and easy to clean. This embodiment has greater structural rigidity and does not divide the light beam as do the lenses shown in FIGURES 6 and 7. Internal reflection is again used to displace the light rays, and in the peripheral zones the rays enter surface 35 and are reflected by surface 33 through the opposite surface 35. It should be noted that these elements need not be cemented or even in contact if the distance between them is controlled, allowing the light beam from one element to be split to adjacent peaks of the other element.

The first step in a specific application of my novel lens design is the choice of a material for its fabrication. If the variable focal length feature is to be used, a flexible plastic like vinyl or cellulose acetate butyrate should be used. In the case of a fixed requirement for focal length, or in a light-gathering system, a rigid material such as polystyrene is preferable.

Having established the index of refraction by choosing the material desired, it is now necessary to determine the angles of entrance and exit rays at various distances from the optical axis.

Given the principles of the present invention, lenses coming within the scope thereof may be designed by the routine application of well known physical and mathematical formulae. The fundamentals of this design will be explained with reference to FIGURES 9 and 10.

Figure 9:
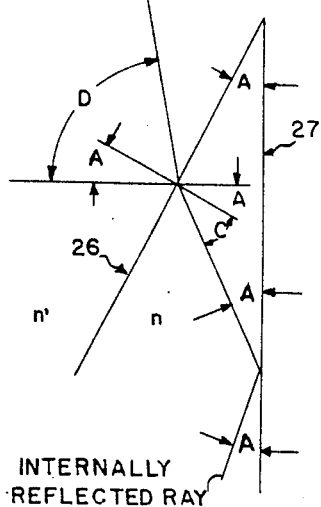
FIGURE 9 is a diagrammatic illustration of the passage of a light ray through a portion of the lens of the present invention.

FIGURE 9 illustrates a portion of a lens coming within the scope of the present invention. For the purposes of this description, FIGURE 9 may be considered an illustration of a portion of the lens illustrated in FIGURE 6. FIGURE 9 has been provided with reference numerals which correspond to those in FIGURE 6. Pursuant to the present invention, surface 26 is designed such that it has a slope parallel to the internally reflected ray shown in FIGURE 9. As further shown in FIGURE 9, angle D indicates the angle between the incident ray and the horizontal while angle A indicates the angle between a line drawn perpendicular to surface 26 and the horizontal and is also the angle at the peak of the lens ridge. Angle C is the angle between a line drawn perpendicular to surface 26 and the refracted light ray after it passes through surface 26. Thus, as per Snell's Law: $n' \sin (D-A)$ equals $n \sin C$, where $n'$ and $n$ are the indices of refraction of, respectively, air and lens material, and $n'$ is, of course, approximately equal to 1.

Thus,
$$2A + C = 90°$$
$$\sin C = \sin (90° - 2A) = \cos 2A$$

and (I) $$\sin (D-A) = n \cos 2A$$

Figure 10:
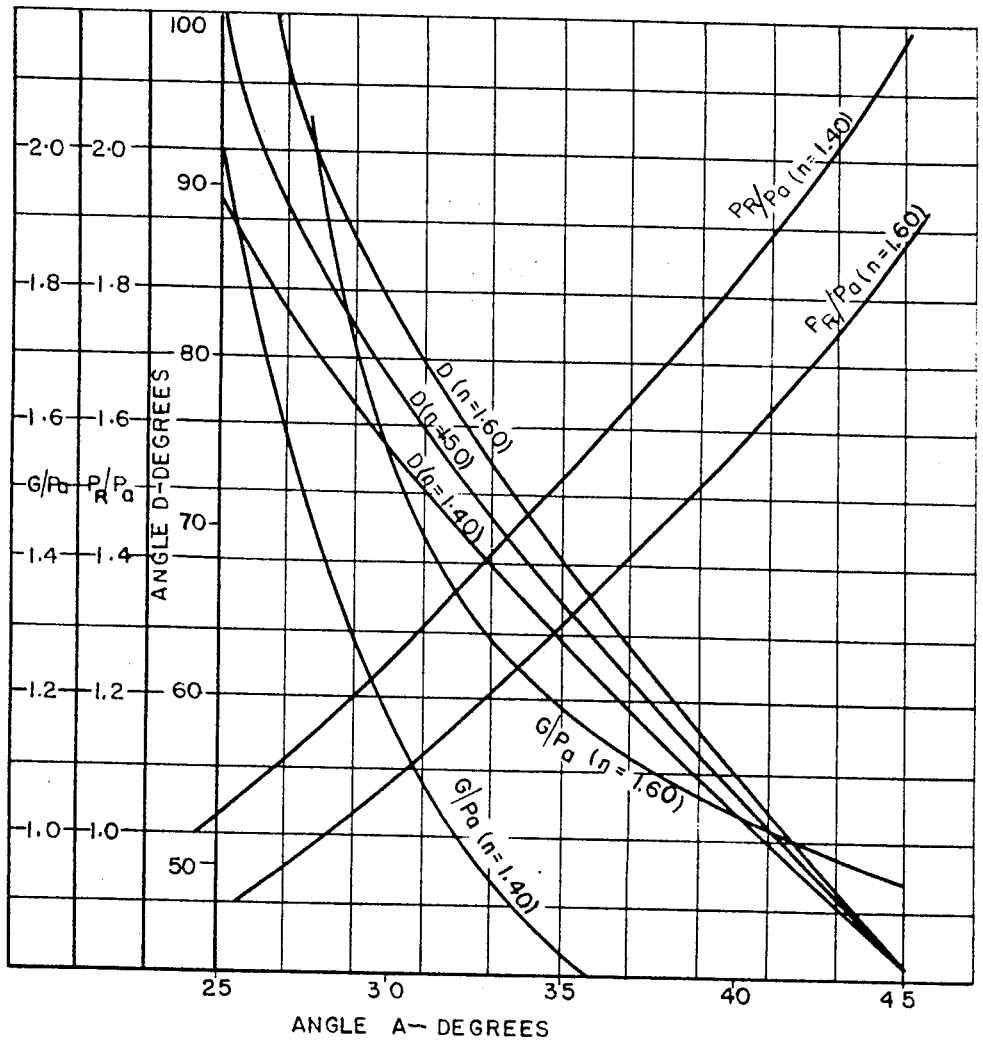
FIGURE 10 is a graph which illustrates relationships helpful in the design of lenses coming within the scope of the present invention.

Given this relationship, it is possible to plot curves representing the relation of A to D for a given index of refraction $n$. Sample curves are illustrated in FIGURE 10 for three different indices of refraction.

The next step in the design of the lens is the determination of an average pitch, i.e., distance between groove peaks. The smaller the pitch which is chosen, the more effective the lens will be in reducing light losses. Thus, the use to which the lens will be put will play a significant role in determining the average pitch. The average pitch, $P_a$, may then be used to determine the base thickness which is indicated as $t$ in FIGURE 6. The base thickness $t$ is determined by the formula:

(II) $$t = EP_a / (2 \tan A)$$

where $P_a$ equals the average pitch over a distance Q and E equals the number of grooves over distance Q. If E is any whole number, the thickness $t$ will be such that the internally reflected rays from surfaces 27 on the incident side of the lens will not impinge on horizontal portions 28 on the emergent side of the lens as illustrated in FIGURE 6. Q is the distance between emerging rays, measured along plane 28, that were initially split while penetrating plane 28 on the entering side.

The actual pitch between each of the grooves, $P_R$, which increases with radius R, may then be determined by using the Formula II used to determine thickness by holding $t$ and E constant. Angle A is a function of the distance from the lens centerline. From this formula, values for the relationship $P_R/P_a$ as a function of angle A may be determined. Curves representing these values for two indices of refraction $n$ are illustrated in FIGURE 10.

The depth of the grooves, i.e., the perpendicular distance from the peak of the lens ridge to horizontal surface 28 may also be determined by simple trigonometry.

If G is the depth of the groove and F is the length of horizontal portion 28:

(III)
$$\cot D = F/G$$
$$\tan A = (P_R - F)/G = P_R/G - \cot D$$
$$G = P_R / (\tan A + \cot D)$$

Once again, non-dimensional curves representing the relation of $G/P_a$ to angle A may be determined and such curves for two values of index of refraction $n$ are illustrated in FIGURE 10.

Thus, the curves in FIGURE 10 may be used to design lenses of the present invention since angle D may be measured by inspection and the remaining design factors then determined from the appropriate curves or calculated individually.

In the case of an image-forming lens combination, each element uses ridges whose cross-sections appear as shown in FIGURE 4. The above calculations are simplified beyond those required for a light-gathering lens such as shown in FIGURE 6, since no horizontal portion 28 is used. This means that there is no specific relationship between pitch and thickness.

Angle A is established solely from angle D. The paraxial ray, as in the design of my image-forming system, is given an angle D of 90°. At all other radial distances, the incident ray is taken as parallel to the paraxial ray.

At any point on the lens surface, the plane of the lens must be bisect the angle between the parallel incident ray and the emergent ray, as established by selection of the focal point for parallel rays. Angle D then becomes the angle between a parallel ray and the plane of the lens at the point involved. Angle A is then found directly from FIGURE 10.

The radially grooved element is never bent in a manner that would alter the angle of the ridges relative to the parallel incident rays. Angle A is therefore the same as that found at the center of the annularly grooved element, if the same material is used. Since there is no required relationship between pitch and thickness, the radial grooves can die out at the center while the thickness is held nearly constant.

There is no required alignment between the ridge pattern on opposite sides in either element, because horizontal portion 28 does not exist.

It will be readily apparent to those skilled in the art that the derivation and application of these relationships, given the concept of the present invention, requires only ordinary mathematical skill. However, for the sake of completeness, the use of these principles to design a specfic lens coming within the scope of the present invention will be described herein.

In a typical overhead projector, it is desired to use a 14" diameter lens to focus rays from a light source 16" away from the plane of the lens into a projection lens 16" away and on the opposite side of the light gathering lens.

Thus, referring to FIGURE 9, angle D min. equals $\tan^{-1} (16/7) = 66° \, 22'$ (D max.=90°). The material chosen for this lens is polystyrene having an index of refraction of 1.60. Thus, by referring to the appropriate curve representing the relation of angle D to angle A for an index of refraction of 1.6 in FIGURE 10, the slope of angle A is found to vary from 28.2° at the lens centerline (where D=90°) to 35.8° at the 7" radius periphery.

For this use, an average pitch $P_a$, of 0.01" is satisfactory from a manufacturing and use standpoint. Since the lens is to be mounted horizontally and subjected to heat, a thickness of about 0.080 is desirable. Thus, if E is chosen as 8, the formula for thickness $t$ gives a result of 0.075".

By using the appropriate curve for $P_R/P_a$ for an index of refraction of 1.6, the pitch at the radii corresponding to various angles A from 28.2° to 35.8° may be determined. Thus, $P_R$ at the 7" periphery will be 0.0135".

Likewise, by using the curve for $G/P_a$ for an index of refraction of 1.6, the depth of cut is found to vary from 0.0186″ at the centerline to 0.0116″ at the 7″ periphery. Thus, the significant dimensions of the lens of the present invention are established for a particular use.

In the case of light-gathering elements, the planar element 28 of FIGURE 6 replaces unused depth of the grooves for the peripheral rays. If the configuration of FIGURE 7 is preferred, planar elements 29 serve the same purpose. However, the base thickness in this case must be chosen to allow the twice-reflected rays to emerge from between the elements 29. Care must also be taken to insure that these rays strike surfaces 29 within about 47° of being parallel with them. Internal reflection will not result if the rays are more nearly normal than this.

For purposes of simplified tooling, the angles of sloped surfaces 21, 26, 31 and 34 may be changed in discreet steps, or may be held constant for the entire radius of the lens. Accuracy of image formation is not affected by the ratio of slope change to radius of lens, but light losses are increased in inverse proportion to the number of discreet steps used. These losses can be somewhat alleviated by increasing pitch $P_R$ with increased radii of the lens, or by decreasing base thickness $t$ as the outer radii of the lens are approached.

It is, of course, understood that various changes and modifications may be made in the details of form, style, design and construction of the whole or any part of the specifically described embodiments of this invention without departing from the spirit thereof; such changes and modifications being within the scope of the following claims.

I claim:

1. A light gathering lens having an optical axis and comprising a sheet of refractive material having first and second sides thereof separated by a thickness of said refractive material;

a plurality of annular ridges extending over substantially the entire areas of said first and second sides;

each of said annular ridges having a reflecting wall and an associated refracting wall thereof wherein the refracting wall is closed to said optical axis than the associated reflecting wall;

each such reflecting wall being substantially perpendicular to the related side;

each such refracting wall extending between the associated reflecting wall and the related side and making an apex angle (A) with the associated reflecting wall;

each such apex angle at any given distance from said optical axis being determined in accordance with the formula:

$$\sin(D-A) = n \cos 2A,$$

where $n$ is the index of refraction of said sheet of refractive material, and $D$ at said given distance is the angle between said first side and an incident light ray originating from a point on said optical axis;

said reflecting walls being spaced from each other by a pitch distanct ($P_a$) such that:

$$\frac{t(2 \tan A)}{P_a}$$

is constant, where $t$ is the thickness between said first and second sides of said refractive material; and wherein each reflecting wall on said first side corresponds to a particular reflecting wall on said second side, each such reflecting wall on said first side being spaced the same particular distance from said optical axis as the corresponding reflecting wall on said second side whereby light from said point on said optical axis passes through said light gathering lens without appreciable chromatic aberration.

2. The light gathering lens of claim 1 wherein the perpendicular distance (G) from a given one of said annular ridges to the related side is determined in accordance with the formula:

$$G = \frac{F}{\cot D}$$

where F is the distance along said related side between said given reflecting surface and the next adjacent refracting surface outward from said optical axis.

3. A light gathering lens comprised of two sheets of refractive material each having an optical axis, a flat side, and a grooved side, comprising:

a plurality of annular grooves extending over substantially the entire area of each of said grooved sides, each of said annular grooves having a reflecting wall substantially perpendicular to the associated flat side and separated from adjacent annular grooves by flat surfaces to form a plurality of annular flat surfaces on said grooved sides;

said sheets of refractive material being located with respect to each other so that their optical axes are coaxial and their annular flat surfaces are in contact with each other and their grooved surfaces are adjacent each other, so that light from a point outside of said lens on said optical axis is incident upon one of said flat sides; and wherein each perpendicular reflecting wall on said first sheet corresponds to a particular perpendicular reflecting wall on the second sheet, each said perpendicular reflecting wall on said first sheet being spaced the same particular distance from said optical axes as the corresponding perpendicular reflecting wall on the second sheet so that said lens contains a plurality of internal annular cavities each having a perpendicular reflecting wall thereof closest to said optical axis, whereby light entering said lens from said point passes through said lens without appreciable chromatic aberration.

4. The lens of claim 3 wherein the distance between successive perpendicular reflecting walls increases with the distance between the optical axis and said perpendicular reflecting walls.

References Cited

UNITED STATES PATENTS

| | | | |
|---|---|---|---|
| 719,066 | 1/1903 | Wadsworth | 350—260 |
| 749,761 | 1/1904 | Wadsworth | 350—262 |
| 812,103 | 2/1906 | Turenne | 240—106.1 |
| 2,260,228 | 10/1941 | Moller et al. | |

DAVID SCHONBERG, *Primary Examiner.*

R. J. STERN, *Assistant Examiner.*

U.S. Cl. X.R.

340—383; 350—184

UNITED STATES PATENT OFFICE
CERTIFICATE OF CORRECTION

Patent No. 3,447,860                                June 3, 1969

James W. Lucas

It is certified that error appears in the above identified patent and that said Letters Patent are hereby corrected as shown below:

Column 4, line 22, "Planer" should read -- Planar --; line 52, "planer" should read -- planar --. Column 5, line 34, "(90°-2A" should read -- (90°-2A) --. Column 6, line 28, cancel "be"; line 49, "specfic" should read -- specific --. Column 7, line 43, "closed" should read -- closer --; line 60, "distanct" should read -- distance --.

Signed and sealed this 1st day of September 1970.

(SEAL)
Attest:

Edward M. Fletcher, Jr.                       WILLIAM E. SCHUYLER, JR.
Attesting Officer                                Commissioner of Patents